United States Patent
Homan et al.

(10) Patent No.: US 7,026,813 B2
(45) Date of Patent: Apr. 11, 2006

(54) SEMI-CONDUCTIVE SHELL FOR SOURCES AND SENSORS

(75) Inventors: Dean M. Homan, Sugar Land, TX (US); Gerald N. Minerbo, Missouri City, TX (US); Sofia Davydycheva, Missouri City, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 156 days.

(21) Appl. No.: 10/605,375

(22) Filed: Sep. 25, 2003

(65) Prior Publication Data

US 2005/0083064 A1 Apr. 21, 2005

(51) Int. Cl.
- G01V 3/00 (2006.01)
- G01V 3/02 (2006.01)
- G01V 3/18 (2006.01)

(52) U.S. Cl. ..................................... 324/247
(58) Field of Classification Search ............... 324/347, 324/332, 333, 334, 338, 351, 354, 355, 356, 324/357; 166/65.1
See application file for complete search history.

(56) References Cited

U.S. PATENT DOCUMENTS

| | | | |
|---|---|---|---|
| 2,725,523 A | 11/1955 | Doll | |
| 2,822,158 A | 2/1958 | Brinton | |
| 3,327,203 A | 6/1967 | Attali | |
| 3,726,738 A * | 4/1973 | Gellon et al. | 156/276 |
| 3,932,747 A | 1/1976 | Sherman | |
| 4,048,495 A | 9/1977 | Ellis | |
| 4,289,168 A | 9/1981 | Lecourt et al. | |
| 4,319,191 A | 3/1982 | Meador et al. | |
| 4,460,638 A * | 7/1984 | Haluska | 442/172 |
| 4,504,736 A | 3/1985 | Smith, Jr. et al. | |
| 4,511,843 A * | 4/1985 | Thoraval | 324/338 |
| 4,538,109 A | 8/1985 | Clark | |
| 4,560,934 A | 12/1985 | Dickinson, III | |
| 4,590,122 A * | 5/1986 | Levin | 442/210 |
| 4,651,101 A | 3/1987 | Barber et al. | |
| 4,684,946 A * | 8/1987 | Issenmann | 340/854.6 |
| 4,968,545 A | 11/1990 | Fellman et al. | |
| 5,233,522 A * | 8/1993 | Sinclair | 702/7 |
| 5,285,008 A | 2/1994 | Sas-Jaworsky et al. | |
| 5,285,204 A | 2/1994 | Sas-Jaworsky | |
| 5,338,617 A | 8/1994 | Workinger et al. | |
| 5,469,916 A | 11/1995 | Sas-Jaworsky et al. | |
| 5,944,124 A | 8/1999 | Pomerleau et al. | |
| 5,988,300 A | 11/1999 | Pomerleau et al. | |

(Continued)

Primary Examiner—Bot Ledynh
Assistant Examiner—Kenneth J. Whittington
(74) Attorney, Agent, or Firm—Bryan L. White; Victor H. Segura; Brigitte L. Echols

(57) ABSTRACT

A composite shell adapted to cover a source or sensor, particularly for subsurface applications. The shell provides transparency to the passage of signals to or from the source or sensor. The shell is adapted with a uniform semi-conductive surface providing a path for electric currents flowing within a subsurface borehole to short near the source or sensor.

30 Claims, 8 Drawing Sheets

U.S. PATENT DOCUMENTS

| | | |
|---|---|---|
| 6,004,639 A | 12/1999 | Quigley et al. |
| 6,050,612 A | 4/2000 | Wolterman |
| 6,084,052 A | 7/2000 | Aufdermarsh et al. |
| 6,288,548 B1 * | 9/2001 | Thompson et al. .......... 324/339 |
| 6,300,762 B1 | 10/2001 | Thomas, Jr. et al. |
| 6,304,086 B1 * | 10/2001 | Minerbo et al. ............ 324/338 |
| 6,614,229 B1 * | 9/2003 | Clark et al. ................. 324/338 |
| 6,667,620 B1 | 12/2003 | Homan et al. |
| 6,710,600 B1 * | 3/2004 | Kopecki et al. ............. 324/338 |
| 6,712,146 B1 * | 3/2004 | Estep et al. ................. 166/377 |
| 6,933,726 B1 * | 8/2005 | Chen et al. ................. 324/339 |
| 2002/0007970 A1 | 1/2002 | Terry et al. |
| 2003/0025503 A1 | 2/2003 | Fanini et al. |
| 2003/0075361 A1 | 4/2003 | Terry et al. |

* cited by examiner

| Layers | 1 | 2 | 3 | 4 | 5 | 6 |
| --- | --- | --- | --- | --- | --- | --- |
| Grouping | Angle | Angle | Angle | Angle | Angle | Angle |
| 1 | 86 | -86 | 86 | -86 | 86 | -86 |
| 2 | 0 | 0 | 0 | 0 | 0 | 0 |
| 3 | 86 | -86 | 86 | -86 | 86 | -86 |
| 4 | 0 | 0 | 0 | 0 | 0 | 0 |
| 5 | 86 | -86 | 86 | -86 | 86 | -86 |
| 6 | 0 | 0 | 0 | 0 | 0 | 0 |
| 7 | 86 | -86 | 86 | -86 | 86 | -86 |
| 8 | 0 | 0 | 0 | 0 | 0 | 0 |

*FIG.* 11

SEMI-CONDUCTIVE SHELL FOR SOURCES AND SENSORS

BACKGROUND OF INVENTION

1. Field of the Invention

The invention relates generally to the use of shells or housings for sources or sensors, particularly for subsurface measurements.

2. Background Art

Various well logging techniques are known in the field of hydrocarbon exploration and production. These techniques typically employ logging instruments or "sondes" equipped with sources adapted to emit energy through a borehole traversing the subsurface formation. The emitted energy interacts with the surrounding formation to produce signals that are detected and measured by one or more sensors on the instrument. By processing the detected signal data, a profile or "log" of the formation properties is obtained.

Logging techniques known in the art include "wireline" logging, logging-while-drilling (LWD), and logging-while-tripping (LWT). Wireline logging entails lowering the instrument into the borehole at the end of an electrical cable to obtain the subsurface measurements as the instrument is moved along the borehole. LWD entails disposing the instrument in a drilling assembly for use while a borehole is drilled through earth formations. LWT involves disposing sources or sensors within the drill string to obtain measurements while the string is withdrawn from the borehole.

Conventional electromagnetic (EM) logging instruments are implemented with antennas that are operable as sources and/or sensors. The antennas are generally coils of the cylindrical solenoid type comprised of one or more turns of insulated conductor wire wound around a support. In operation, the transmitter antenna is energized by an alternating current to emit EM energy through the borehole fluid (also referred to as "mud") used in the drilling operation and into the formation. The signals detected at the receiver antenna reflect interaction with the mud and the formation. It is well known that measurements obtained by induction-type logging are affected by direct transmitter-to-receiver coupling. Thus with induction-type logging, the instrument is typically equipped with one or more "bucking" antennas disposed near the transmitter or receiver to eliminate or reduce these coupling effects.

The antennas are typically mounted with their axes along the longitudinal instrument axis. Thus, these instruments are implemented with antennas having longitudinal magnetic dipoles (LMD). When such an antenna is placed in a borehole and energized to transmit EM energy, currents flow around the antenna in the borehole and in the surrounding formation. There is no net current flow up or down the borehole. However, with instruments incorporating antennas having tilted or transverse coils, i.e., where the antenna's axis is not parallel to the support axis, a current flow exists under certain circumstances. These instruments are implemented with antennas having a transverse or tilted magnetic dipole (TMD). Some TMD antennas are configured with multiple coils. One TMD antenna design comprises a set of three coils, known as a triaxial antenna. Logging instruments equipped with TMDs are described in U.S. Pat. Nos. 4,319,191, 5,508,616, 5,757,191, 5,781,436, 6,044,325, 6,147,496.

A particularly troublesome property of the TMD is the extremely large borehole effect that occurs in high contrast situations, i.e., when the mud in the borehole is much more conductive than the formation. When a TMD is placed in the center of a borehole, there is no net current along the borehole axis. When it is eccentered in a direction parallel to the direction of the magnetic moment, the symmetry of the situation insures that there is still no net current along the borehole axis. However, when a TMD is eccentered in a direction perpendicular to the direction of the magnetic moment, axial currents are induced in the borehole. FIG. 1 illustrates the different TMD eccentricities within the borehole. In high contrast situations these currents can flow for a very long distance along the borehole. When these currents pass by TMD antennas, they can cause undesired corruptive signals that are many times larger than would appear in a homogeneous formation without a borehole. FIG. 2 illustrates this axial current flow encountered along the borehole with a non-conductive instrument. Further description of this "borehole effect" is found in U.S. Pat. Nos. 6,573,722, 6,556,015 and 6,541,979.

In wireline applications, the antennas are typically enclosed by a housing constructed of a tough plastic material composed of a laminated fiberglass material. In LWD applications, the antennas are generally mounted on a metallic support to withstand the hostile environment and conditions encountered during drilling. Conventional logging instruments are also being constructed of thermoplastic materials. The thermoplastic composite construction of these instruments provides a non-conductive structure for mounting the antennas. U.S. Pat. Nos. 6,084,052, 6,300,762, 5,988,300, 5,944,124 and GB 2337546 describe implementations of composite-based instruments and tubulars for oilfield operations.

Techniques to reduce or correct for induced axial currents due to TMD antennas are emerging in the field. U.S. Pat. Nos. 5,041,975 and 5,058,077 describe techniques for processing signal data from downhole measurements in an effort to correct for borehole effects or to compensate for the effect of eccentric rotation on the sensor while drilling. U.S. Pat. No. 4,651,101 describes a logging sonde configured to cancel electric fields on the sonde surface. Additional techniques for addressing the borehole effect are found in U.S. Pat. Nos. 6,573,722, 6,556,015, and 6,541,979. These techniques involve complicated signal processing and/or the implementation of additional components to the instruments in order to address the currents. Thus there remains a need for improved techniques to handle these undesired borehole currents.

SUMMARY OF INVENTION

One aspect of the invention is a shell for use in a subsurface borehole. The shell comprises a composite body adapted to cover a source or sensor, providing transparency to the passage of signals to or from the source or sensor; wherein the body is adapted with a uniform conductive surface providing a path to short electric currents near the source or sensor.

Another aspect of the invention is an apparatus for use in a subsurface borehole. The apparatus comprises an elongated support; an antenna disposed on the support, the antenna adapted to transmit or receive electromagnetic energy; and a composite shell disposed on the support to cover the antenna, the shell providing transparency to the passage of electromagnetic energy; wherein the shell is adapted with a uniform conductive surface providing a path to short electric currents near the antenna.

Another aspect of the invention is an apparatus for use in a subsurface borehole. The apparatus comprises an antenna adapted to transmit or receive electromagnetic energy; a composite shell covering the antenna, the shell providing transparency to the passage of electromagnetic energy; wherein the shell is adapted with a uniform conductive surface providing a path to short electric currents near the antenna; and a conductor coupled to the shell to pass the electric currents through the shell.

BRIEF DESCRIPTION OF DRAWINGS

Other aspects and advantages of the invention will be apparent from the following description and the appended claims.

FIG. 11 is a table of various groupings of prepreg layers for sleeve embodiments of the invention.

DETAILED DESCRIPTION

Figure 3:
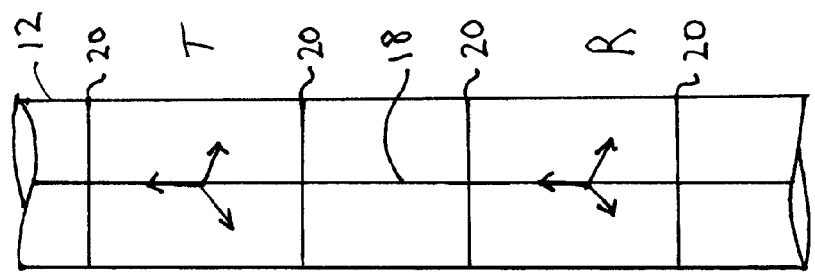
FIG. 3 is a schematic diagram of a semi-conductive sleeve and triaxial antenna array in accord with the invention.

FIG. 3 shows an embodiment of the invention. A sleeve 12 is shown covering a source and sensor array. The term sleeve is used herein to generally define an outer surface such as a shell or housing. The source is a TMD transmitter T and the sensor is a TMD receiver R of the type known in the art (e.g., as described in U.S. Pat. Nos. 6,351,127, 6,566,881, 6,584,408). The sleeve 12 is formed of a composite material consisting of graphite cloth and carbon loaded epoxy or a mixture of fiberglass and carbon fiber. The sleeve 12 is formed to provide a semi-conductive exoskeleton for the sources/sensors. It will be appreciated that the present invention is not limited to any particular number or combination of transmitters or receivers. Embodiments may include any mixture of LMD and TMD type sources/sensors.

The conductivity of the sleeve 12 can be varied by altering the percentage of carbon in the composition as further described below. As such, the sleeve can be made more conductive than the most conductive water base mud used in conventional drilling operations (e.g. 10 times more conductive). By electrically coupling the sleeve 12 to a conductive support 18 housed within the sleeve, currents flowing within the borehole are directed or shorted through the sleeve to the support 18. The support 18 may be formed of any suitable conductive material (e.g. a copper tube as described in U.S. Pat. No. 4,873,488) and the sources/sensors may be mounted thereon as known in the art and described in the previously mentioned patents.

The sleeve 12 is electrically coupled to the conductive support 18 via one or more conductors 20 affixed between the shell's inner surface and the support. The conductor(s) 20 may be formed of any suitable conductive material and structure (e.g. metallic wire, conductive strap, etc.) and coupled between the structures using known means such as conventional fasteners or bonding techniques known in the art.

Figure 2:
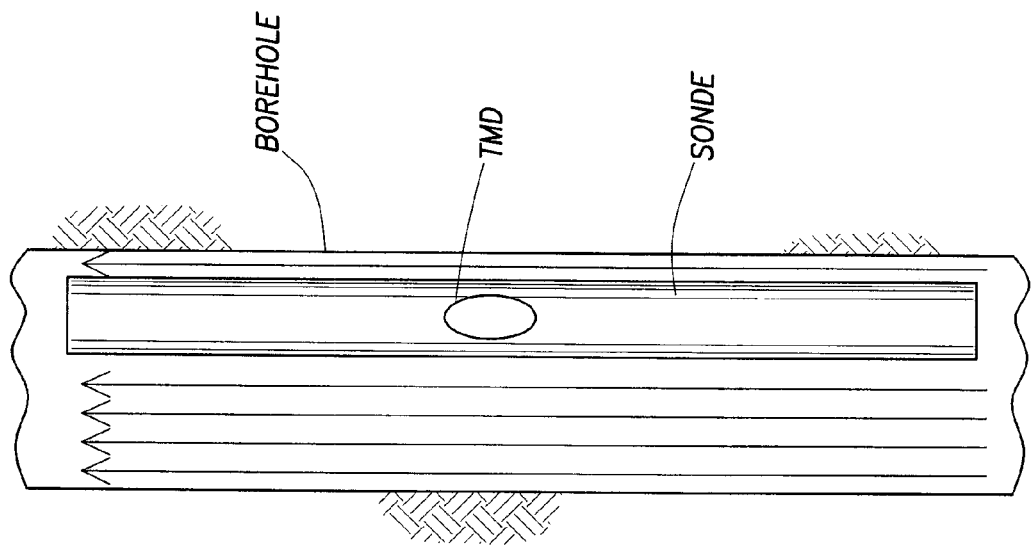
FIG. 2 is a schematic diagram of the induced axial current flow encountered in a conductive borehole with an instrument having a perpendicularly eccentered tilted or transverse magnetic dipole and an insulating housing.
Figure 1:
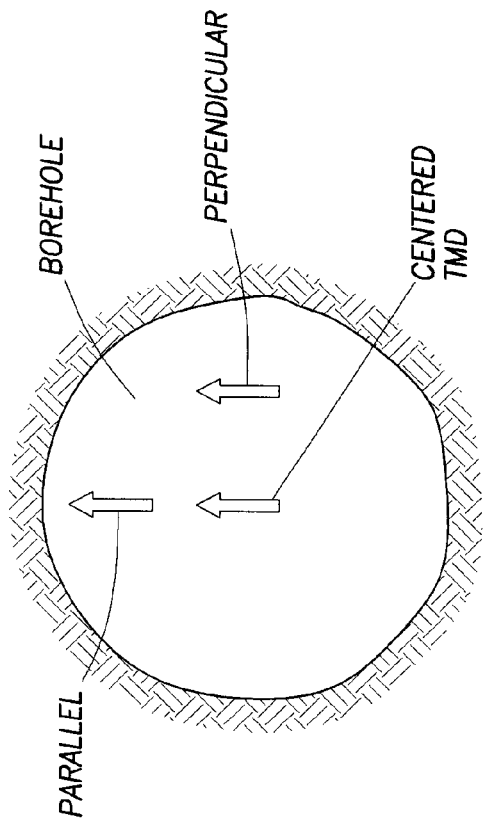
FIG. 1 shows a pictorial looking downhole of parallel and perpendicular eccentering of a tilted or transverse magnetic dipole within a borehole.
Figure 4:
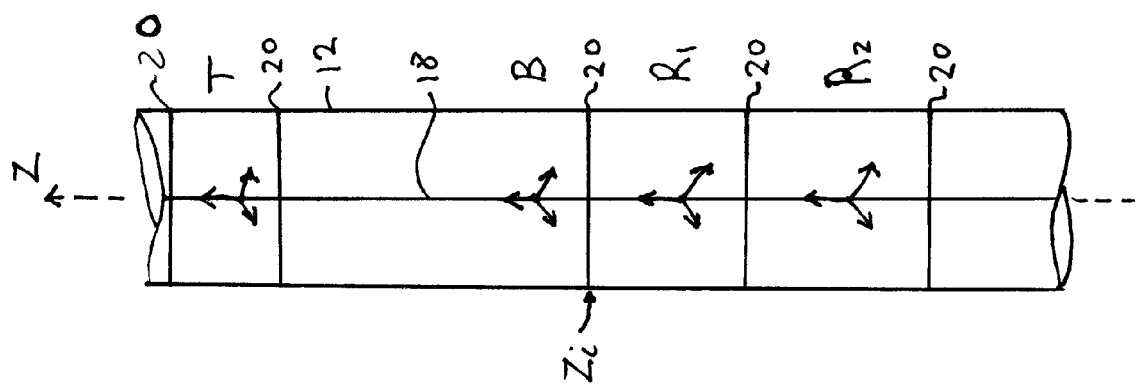
FIG. 4 is a schematic diagram of another semi-conductive sleeve and sources/sensors configuration in accord with the invention.

While the distribution and placement of connectors 20 along the support 18 is variable, different displacements may have different effects on the signals detected at the receivers. FIG. 4 shows another embodiment of the invention. This embodiment includes several TMD antennas: one transmitter T, two receivers $R_1$, $R_2$, and a bucking antenna B. Connectors 20 are shown symmetrically disposed about the transmitter T and receiver $R_2$, i.e., at the same distance above and below the respective antennas. An additional connector 20 is disposed between the $R_1$-B antenna pair along the z-axis of the support 18 at a position established by $$Z_i = \frac{2}{\frac{1}{L_{Ei}} + \frac{1}{L_{Ri}}}, \tag{1}$$

where L is the respective distance from transmitter T to the i-th B and R antennas.

Figure 5:
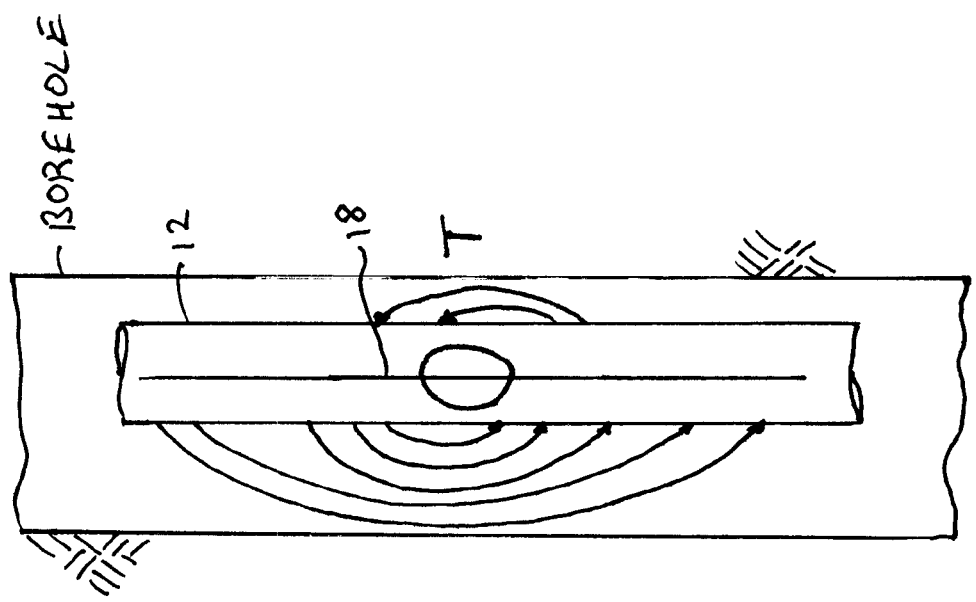
FIG. 5 is a schematic diagram of the borehole axial current flow about a source housed within a mildy-conductive sleeve in accord with the invention.

By covering or shielding the transmitter T or receiver R with a mildly conductive sleeve 12 and shorting the sleeve to the support 18, a path is provided for electric currents flowing within the borehole to short near the antenna(s) as shown in FIG. 5. Thus eliminating or minimizing the undesired effects due to borehole currents. While the embodiments of FIGS. 3 and 4 are shown with the antennas disposed on the support 18, other embodiments can be implemented with the antennas partially or wholly embedded within the sleeve 12, provided proper insulation or shielding (e.g. rubber molding or potting) is used to isolate the antenna (not shown). In operation, the conductive path runs through the sleeve to short the current in a manner that would not couple with the housed antenna.

Figure 6:
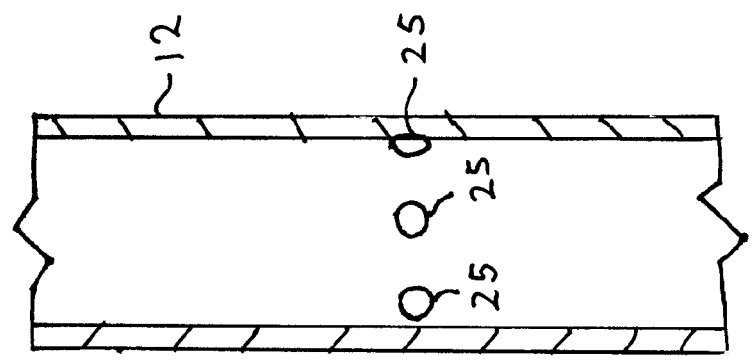
FIG. 6 is a schematic diagram of a sleeve embodiment of the invention.

FIG. 6 shows a sleeve 12 of the invention. In this embodiment, the sleeve 12 includes one or more conductive "buttons" 25 or plugs embedded within the sleeve 12 to reach the I.D. of the sleeve. The buttons 25 may be any conductive material, preferably metal, and they are inlaid within the shell body such that they allow for contact with the conductors 20 extending between the sleeve I.D. and support 18 (shown in FIGS. 3 and 4). The buttons 25 provide a reliable junction for a current path between the sleeve 12, the conductor 20, and the support 18. Though shown as discs or plugs, the buttons 25 are not limited to any particular shape or configuration. Any suitable conductive element and configuration may be used to provide the desired conductive junction.

Figure 7:
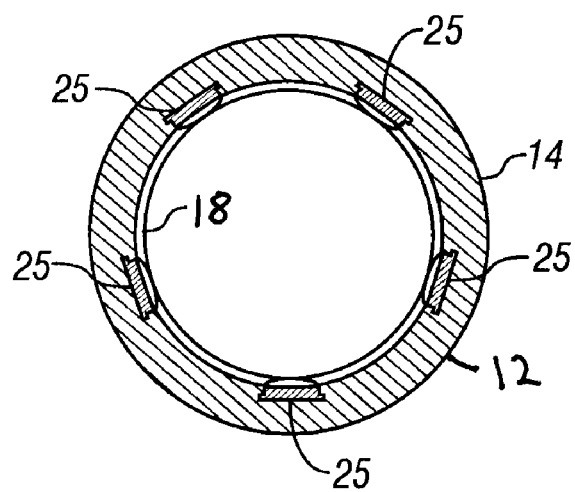
FIG. 7 is a cross-section of a sleeve embodiment surrounding a support member in accord with the invention.

FIG. 7 shows a cross-section of another sleeve 12 of the invention in place over a support 18. In this embodiment, the buttons 25 are configured such that they extend into the I.D. to make direct contact with the O.D. of the support 18 without the need for intermediate conductors 20. In one embodiment, the buttons 25 may be disposed within recesses in the sleeve and spring-loaded with rounded tips (e.g. ball bearings) to provide for reliable coupling (not shown).

Figure 8:
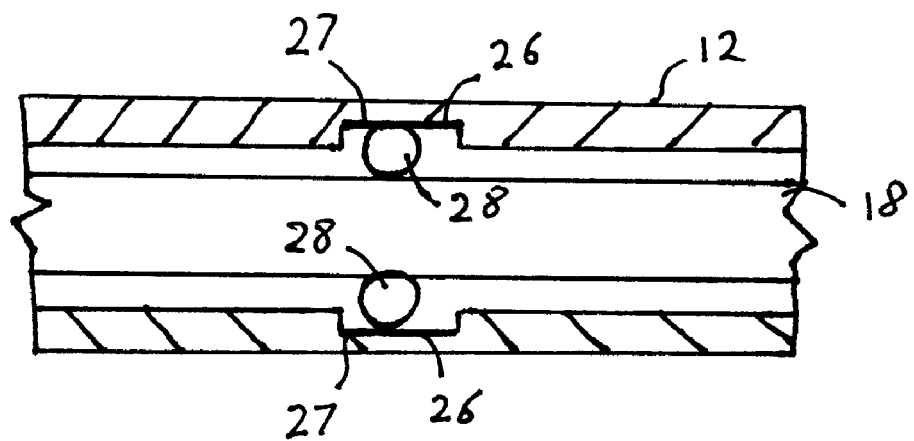
FIG. 8 is a schematic diagram of a sleeve embodiment surrounding a support member in accord with the invention.

FIG. 8 shows another sleeve of the invention. In this sleeve 12, a conductive element 26 (e.g. a metallic plate or disc) is disposed within an azimuthal recess 27 formed along the I.D. of the sleeve 12. A conductor 28 is disposed within the recess 27 extending into the I.D. of the sleeve to make contact with the support 18, thereby providing a current path between the sleeve and the support. Any suitable electrical conductor 28 may be used (e.g. a wire, a spring, or a metal-covered o-ring).

It will be appreciated by those skilled in the art that the conductive elements affixed to the sleeves of the invention (such as the buttons 25 and elements 26) can be disposed therein using any suitable techniques known in the art. For example, the buttons 25 may be interleaved within the sleeve during the layering process described below, or the elements 26 can be pressed into the sleeve after forming the recesses 27. Other embodiments can be implemented with the conductive elements formed via various known techniques, including film deposition, film growth, spray coating, liquid phase epitaxy, etching, plating, etc.

Adhesives (e.g. polyimides, epoxies, and acrylics) may also be used to bond the conductive elements to the sleeve. The effects of thermal expansion may be reduced by choosing conductive elements with a coefficient of expansion near to that of the sleeve 12. The elements are preferably embedded or assembled into the sleeve in such a way so that they are securely bonded to the sleeve 12. It will also be appreciated that the conductors 20 may be coupled between the support 18 and the conductive sleeve elements in various fashions, what matters is that the desired current path is established between the sleeve 12 and the support 18.

Techniques for impregnating fabrics with resins are not new. U.S. Pat. Nos. 4,289,168 and 4,968,545 describe techniques for making composite pipes. However, the use of such fabrics and pipes in downhole applications entails consideration of different factors. For downhole applications, a mildly conductive thermal set or thermal plastic sleeve should have homogeneous tensor volume resistivity and at least trans-isotropic properties. It is also preferable that the volume resistivity be independent of both temperature and pressure below the glass transition of the epoxy and/or resin.

Figure 9:
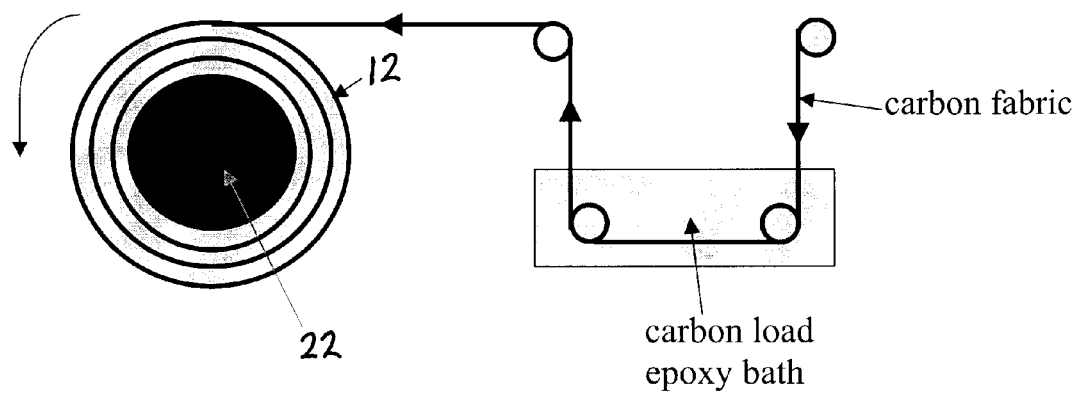
FIG. 9 is a schematic diagram showing a manufacturing sequence for impregnating carbon fabric with carbon-loaded epoxy and wrapping the loaded fabric on a rotating mandrel for forming an elongate cylindrical housing or shell in accord with the invention.

A thermal set sleeve 12 of the invention can be constructed with a carbon powder loaded epoxy and a plain weave carbon fabric. The epoxy is prepared by adding 0%-n % by weight carbon powder and then mixing it well in a heated mixture. The tensor volume resistivity is linearly dependant on the percentage of carbon added to the epoxy. The fabric is then run through a bath of carbon-loaded epoxy and wrapped with tension about a mandrel 22 as shown in FIG. 9. It is preferable to keep the weave pattern parallel from each consecutive layer. This procedure ensures the homogeneity of the volume resistivity.

The carbon powder added to the epoxy increases the overall conductivity, but is added to specifically increase the radial conductivity of the sleeve. Here the carbon particles increase the connectivity radially between the layers of fabric. The conductivity in the z and $\phi$ direction is nearly the same primarily due to the fact that the carbon fibers in the weave are directed equally in the z and $\phi$ directions. One can vary the z and $\phi$ conductivity by varying the percent of fiberglass to carbon fibers in the weave.

Figure 10:
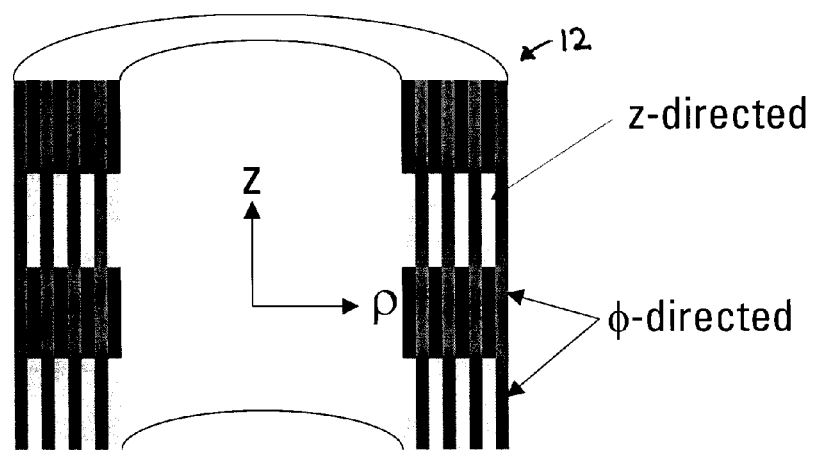
FIG. 10 is a cut-away of a prepreg graphite sleeve illustrating a fiber ribbon layout in accord with the invention.

The basic building material of the thermal plastic for the sleeve 12 is the pre-impregnated graphite fiber strip. The carbon fibers are laid along the length of the strip. To obtain a conductivity in a tube that is similar in z and $\phi$ direction, the prepregs are laid equally in the z and $\phi$ direction volumetrically. The radial conductivity is less since no fibers are laid in the radial direction. FIG. 10 illustrates one such prepreg layout. The horizontal layer is put down by following a helix with a pitch preferably equal to the width of the prepreg. Thus, to decrease the pitch one can put down prepregs with lesser widths. Other sleeve embodiments may be formed by extruding carbon (fiber or powder) loaded thermal plastics using extrusion techniques known in the art (not shown). For example, such embodiments may be implemented with PEEK™/Graphite, TORLON™ resin, or other suitable commercially available compositions.

FIG. 11 shows a table describing various groupings of prepreg layers according to the invention. There are six layers per eight groupings. The +86 and 86 describes the circumferential layer being put down clockwise and counter clockwise, respectively. This build has been shown empirically to yields a homogeneous tran-isotropic tube. The measured conductivities for the build shown in FIG. 11 are:

$$\sigma_z = \sigma_\phi = 1000 \text{ S/m}$$

$$\sigma_\phi = 0.23 \text{ S/m} \tag{2}$$

As described above, the impregnation techniques of the invention produce a homogeneous isotropic material of variable conductivity and desired dimensions. The sleeve 12 composition essentially provides a uniform boundary for the currents flowing within the borehole for typical signal frequencies used in logging operations. With the sleeve 12 surface composed with a greater conductivity than the borehole mud, the source or sensor signals are virtually unaffected by undesired borehole currents. Thus the sleeves 12 of the invention are mildly conductive yet mechanically strong and electromagnetically transparent to desired signals.

Figure 12:
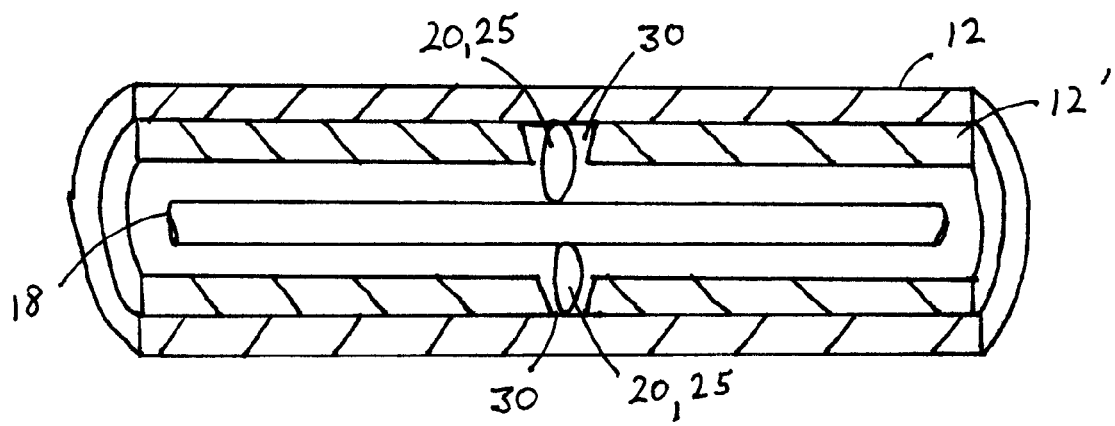
FIG. 12 is a schematic diagram of a multi-sleeve embodiment of the invention.

The inherent strength of the graphite sleeve 12 allows for embodiments of various thickness and diameters. Thin or "slick" downhole tools can be implemented using the sleeves 12 of the invention. FIG. 12 shows another embodiment of the invention. In this embodiment, the semi-conductive sleeve 12 forms the exterior of a multi-tubular structure. An inner sleeve 12' is surrounded by a semi-conductive sleeve 12 of the invention. As described herein, the semi-conductive sleeve 12 provides an alternative path for undesired axial borehole currents while permitting desired signal transfer therethrough. This can be accomplished as long as the sleeve 12 outer surface provides the proper conductivity within the borehole environment. The inner sleeve 12' adds greater support to the assembly, in essence forming an inner skeleton. Any suitable material or composites may be used for the inner sleeve 12', including commercially available materials such as RANDOLITE™, PEEK™, KEVLAR™, fiberglass, or polyaryletherketone-based thermoplastic materials as described in U.S. Pat. Nos. 6,084,052 and 6,300,762.

Openings 30 in the inner sleeve 12' allow for the conductors 20 or buttons 25 to couple between the outer sleeve 12 and the support 18 when assembled. Other embodiments may be implemented with inner sleeves 12' of various lengths and multiple inner sleeves spaced such that channels are not needed for conductors 20 or buttons 25 (not shown). Yet other embodiments can be implemented with conductors disposed within the inner sleeve 12' itself and coupled to the outer sleeve to form a conductive junction with the internal support 18 (not shown).

The sleeves of the invention may be implemented with a system having a plurality of conventional sources or sensors to obtain a variety of measurements (e.g. acoustic, nuclear, gravity) as known in the art. Conventional EM antennas may be placed on the support 18 in various sets or configurations and operated at various frequencies to obtain the desired EM measurements. It will also be appreciated by those skilled in the art that the axial spacing and placement of the antennas along the tool may be varied to alter the signal strength and measurement sensitivity.

Figure 13:
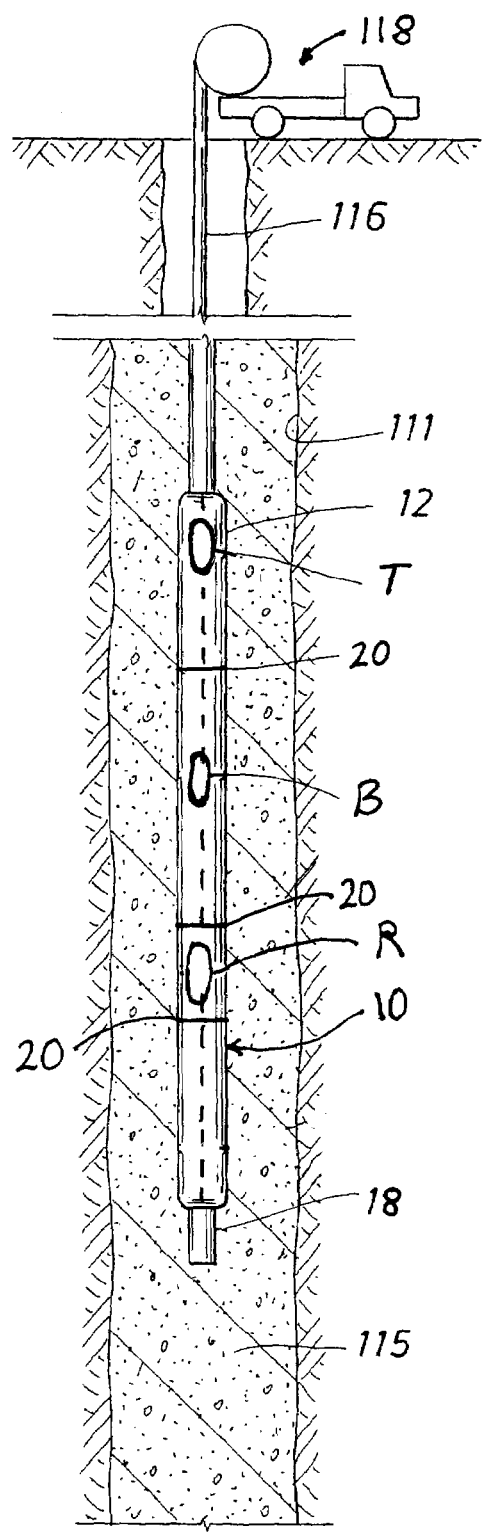
FIG. 13 is a schematic diagram of well logging system using a sleeve in accord with the invention.

FIG. 13 generally shows a well logging system of the invention. The system includes a logging tool 10 having a TMD antenna array consisting of a transmitter T, a bucking antenna B, and a receiver R housed within a sleeve 12 of the invention and disposed in a borehole 115 traversing a formation 111. The tool 10 is shown supported in the borehole 115 by a logging cable 116 in the case of a wireline system or a drill string 116 in the case of a while-drilling system. With a wireline tool, the tool 10 is raised and lowered in the borehole 115 by a winch, which is controlled by the surface equipment 118. Logging cable or drill string 116 includes conductors (not shown) that connect the downhole electronics with the surface equipment 118. The tool 10 includes electronics to control the transmitter T to generate the respective magnetic moments (not shown). Signals detected at the receivers 16 may be communicated to the surface equipment 118 via conventional telemetry means for processing (not shown).

Figure 14:
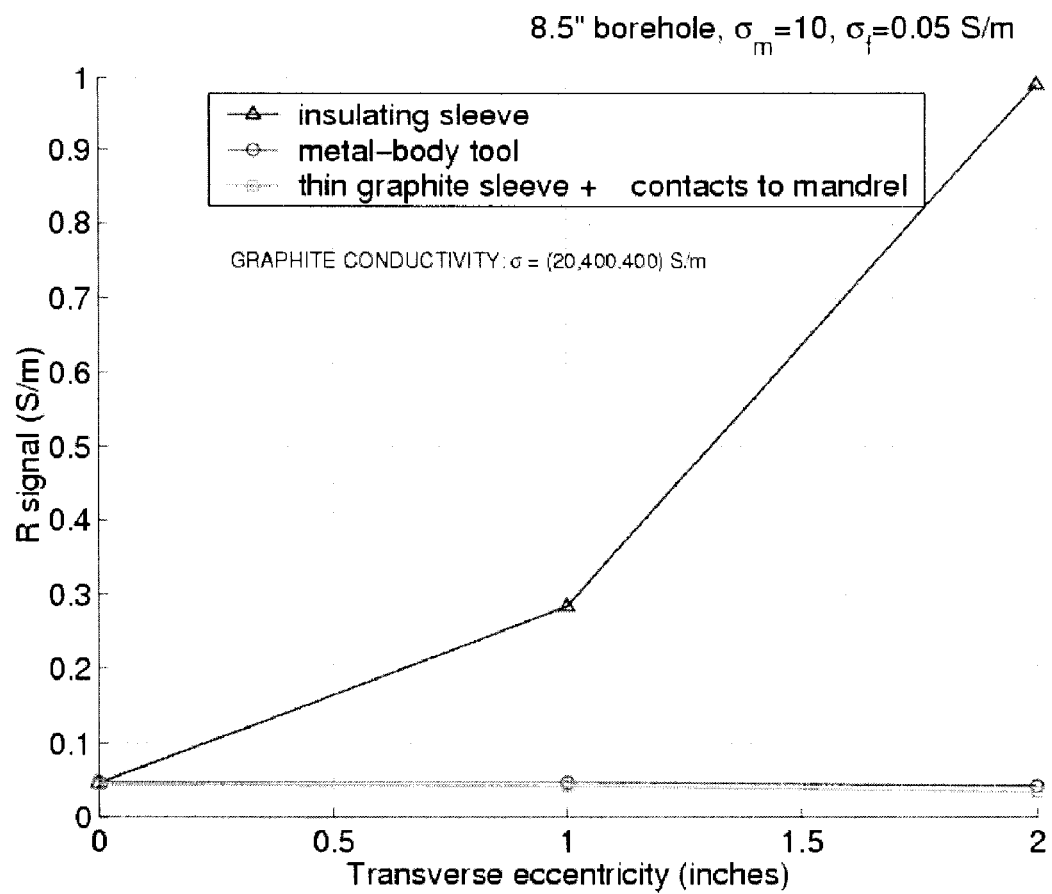

Modeling was conducted to study the borehole effect on TMD-equipped instruments with the semi-conductive sleeves of the invention. Two reference models were also studied: a metal body design without a sleeve, and an insulating sleeve design. FIG. 14 compares the transverse eccentricity response of the three designs. The semi-conductive sleeve design gives an error signal similar to the metal-body tool, and much smaller than the insulating sleeve design. Thus the semi-conductive sleeves of the invention provide very good signal response in addition to superior mechanical strength properties.

While the invention has been described with respect to a limited number of embodiments, those skilled in the art, having benefit of this disclosure, will appreciate that other embodiments can be devised which do not depart from the scope of the invention as disclosed herein. It will be appreciated that the sleeves of the invention are not limited to any one particular application. They may be used in while-drilling, while-tripping, coiled tubing, reservoir monitoring, casings, etc. In addition to the conductive properties of the sleeve, its strength makes it suitable for exoskeleton applications such as source/sensor shields on downhole tools and in fields beyond oilfield operations. Other embodiments may also be implemented as partial or semi sleeves incorporated into non-composite downhole apparatus (not shown).

For the purposes of this specification it will be clearly understood that the word "comprising" means "including but not limited to", and that the word "comprises" has a corresponding meaning.

The invention claimed is:

1. A shell for use in a subsurface borehole, comprising:
a composite body forming a cylindrical surface of revolution with an inner bore for housing a source or sensor, providing transparency to the passage of signals to or from said source or sensor, the composite body comprising a plurality of layers, at least one layer being substantially uniformly conductive along a single direction; and
a recess formed by the body extending from the inner bore toward the outer surface of the body;
a conductor element disposed within the recess:
wherein the body is adapted with a uniform conductive surface providing a path to short electric currents near the source or sensor.

2. The shell of claim 1, wherein the body is adapted to provide transparency to the passage of electromagnetic signals.

3. The shell of claim 2, wherein the body is formed to prevent direct exposure of the source or sensor to fluids within the borehole.

4. The shell of claim 3, wherein the body forms a cylindrical surface of revolution with an inner bore adapted to house the source or sensor.

5. The shell of claim 4, further comprising a second cylindrical surface of revolution disposed within the inner bore of the body in contact with the inner surface of the body, the second surface adapted to provide transparency to the passage of electromagnetic signals.

6. The shell of claim 5, wherein the second surface of revolution comprises an opening along its cylindrical wall providing a channel between its inner bore and the inner surface of the shell body.

7. The shell of claim 1, wherein the body comprises a composite graphite material including carbon particles disposed therein.

8. The shell of claim 1, wherein the body comprises a carbon-loaded epoxy mixed with carbon fabric.

9. The shell of claim 1, wherein the body comprises multiple prepreg graphite layers.

10. The shell of claim 1, wherein the body comprises concentric layers of fabric including carbon particles disposed therein.

11. The shell of claim 1, wherein the body is formed of carbon-loaded thermal plastic.

12. An apparatus for use in a subsurface borehole, comprising:
an elongated support;
an antenna disposed on the support, the antenna adapted to transmit or receive electromagnetic energy; and
a composite shell forming a sleeve disposed around the support and having an inner bore to house the antenna, the shell providing transparency to the passage of electromagnetic energy, the composite shell comprising a plurality of layers, at least one layer being substantially uniformly conductive along a single direction;
the sleeve including a recess extending from the inner bore toward the outer surface of the sleeve; and
a conductive element disposed within the recess:
wherein the shell is adapted with a uniform conductive surface providing a path to short electric currents near the antenna.

13. The apparatus of claim 12, further comprising a conductor coupled to the sleeve to pass electric current through the sleeve and into said inner bore.

14. The apparatus of claim 13, wherein the elongated support consists of a metallic tubular and the conductor coupled to the sleeve to pass electric current is coupled to said tubular.

15. The apparatus of claim 12, wherein the sleeve comprises a composite graphite material including carbon particles disposed therein.

16. The apparatus of claim 12, wherein the sleeve comprises a carbon-loaded epoxy mixed with carbon fabric.

17. The apparatus of claim 12, wherein the sleeve comprises multiple prepreg graphite layers.

18. The apparatus of claim 12, wherein the antenna comprises a plurality of coils having non-parallel axes.

19. The apparatus of claim 12, wherein said antenna is disposed on said support with its axis at an angle with respect to the support axis.

20. The apparatus of claim 12, further comprising a second sleeve disposed within the inner bore of the composite sleeve in contact with the inner surface of said sleeve, the second sleeve adapted to provide transparency to the passage of electromagnetic energy.

21. The apparatus of claim 20, wherein the second sleeve comprises an opening along its wall providing a channel between its inner bore and the inner surface of the outer sleeve.

22. The apparatus of claim 12, wherein the sleeve is formed of carbon-loaded thermal plastic.

23. An apparatus as for use in a subsurface borehole, comprising:
   an antenna adapted to transmit or receive electromagnetic energy;
   a composite shell forming a sleeve having an inner bore to house the antenna, the shell providing transparency to the passage of electromagnetic energy, the composite shell comprising a plurality of layers, at least one layer being substantially uniformly conductive along a single direction;
   the sleeve including a recess extending from the inner bore toward the outer surface of the sleeve;
   a conductive element disposed within the recess;
   wherein the shell is adapted with a uniform conductive surface providing a path to short electric currents near the antenna; and
   a conductor coupled to the shell to pass said electric currents through said shell.

24. The apparatus of claim 23, wherein the shell comprises a composite graphite material including carbon particles disposed therein.

25. The apparatus of claim 23, wherein the shell comprises a carbon-loaded epoxy mixed with carbon fabric.

26. The apparatus of claim 23, wherein the shell comprises multiple prepreg graphite layers.

27. The apparatus of claim 23, wherein the antenna comprises a plurality of coils having non-parallel axes.

28. The apparatus of claim 23, further comprising a second sleeve disposed within the inner bore of the composite sleeve in contact with the inner surface of said sleeve, the second sleeve adapted to provide transparency to the passage of electromagnetic energy.

29. The apparatus of claim 28, wherein the second sleeve comprises an opening along its wall providing a channel between its inner bore and the inner surface of the outer sleeve.

30. The apparatus of claim 23, wherein the shell is formed of carbon-loaded thermal plastic.

* * * * *